United States Patent
Kurimura et al.

(10) Patent No.: US 7,177,070 B2
(45) Date of Patent: Feb. 13, 2007

(54) WAVELENGTH CONVERSION ELEMENT

(75) Inventors: Sunao Kurimura, Tsukuba (JP); Masaki Harada, Tokyo (JP)

(73) Assignee: National Institute for Materials Science, Ibaraki (JP)

( * ) Notice: Subject to any disclaimer, the term of this patent is extended or adjusted under 35 U.S.C. 154(b) by 61 days.

(21) Appl. No.: 10/522,698

(22) PCT Filed: Sep. 18, 2003

(86) PCT No.: PCT/JP03/11881

§ 371 (c)(1),
(2), (4) Date: Mar. 11, 2005

(87) PCT Pub. No.: WO2004/027512

PCT Pub. Date: Apr. 1, 2004

(65) Prior Publication Data

US 2005/0174629 A1   Aug. 11, 2005

(30) Foreign Application Priority Data

Sep. 20, 2002   (JP)   ............... 2002-276000

(51) Int. Cl.
  *G02F 1/35*   (2006.01)
  *G02F 1/365*   (2006.01)
(52) U.S. Cl. ...................... 359/326; 359/332
(58) Field of Classification Search ........ 359/326–332; 385/122
See application file for complete search history.

(56) References Cited

U.S. PATENT DOCUMENTS 5,382,334 A   1/1995   Miyaguchi et al.

5,781,670 A * 7/1998 Deacon et al. ............... 385/10

(Continued)

FOREIGN PATENT DOCUMENTS

JP   03-237437 A   10/1991

(Continued)

OTHER PUBLICATIONS

Kurimura et al, "Shigai Hacho Henkan o Mezashita Giji Iso Seigo Suishi" ("Quasi-Phase-Matching Quartz Aiming at Ultraviolet Wavelength Conversion"), Oyo Butsuri, vol. 69, No. 5, pp. 548-552, Jun. 2000.*

(Continued)

*Primary Examiner*—John D. Lee
(74) *Attorney, Agent, or Firm*—Frishauf, Holtz, Goodman & Chick, P.C.

(57) ABSTRACT

Two grooves 10 are diced in parallel along the light passage direction in a quartz quasi-phase matching element 1. Consequently, as is shown in (b) and (c), a protruding part 11 which is positioned between the two grooves 10 is formed on the upper surface side (in the figures), and a ridge type waveguide 9 is formed inside this protruding part. Accordingly, if light is caused to pass through this ridge type waveguide 9, the light can be caused to pass through the portions with inverted crystal axes (polarization inversion regions) 4, and can be subjected to a wavelength conversion, in a state in which the light is confined into the ridge type wavelength guide 9. As a result, a state can be produced in which the energy of the light is high inside the wavelength conversion region, so that a high wavelength conversion efficiency can be obtained.

1 Claim, 4 Drawing Sheets

U.S. PATENT DOCUMENTS

2001/0055453 A1    12/2001    Mizuuchi et al.

FOREIGN PATENT DOCUMENTS

JP    11-212128 A    8/1999
JP    2002-122898 A    4/2002

OTHER PUBLICATIONS

Tadashi Kurimura et al, "Shigai Hacho Henkan o Mezashita Giji Iso Seigo Suisho", Oyo butsuri, vol. 69, No. 5, pp. 548-552 (2000).

L. Babsail et al, Second-harmonic generation in ion-implanted quartz planar waveguides, Appl. Phys. Lett., vol. 59, No. 4, pp. 384-386 (Jul. 22, 1991).

Tadashi Kurimura et al, "Shigai Hacho Henkan o Mezashita Giji Iso Seigo Suisho", Oyo butsuri, *Applied Physics*, vol. 69, No. 5, pp. 548-552 (2000).

L. Babsail et al, Second-harmonic generation in ion-implanted quartz planar waveguides, *Appl. Phys. Lett.*, vol. 59, No. 4, pp. 384-386 (Jul. 22, 1991).

* cited by examiner

WAVELENGTH CONVERSION ELEMENT

This application is the United States national phase application of International Application PCT/JP2003/011881 filed Sep. 18, 2003.

TECHNICAL FIELD

The present invention relates to a wavelength conversion element that is used to output a wavelength that differs from that of the incident light by using a quasi-phase matching technique.

BACKGROUND ART

Especially in the field of optical communications, wavelength conversion techniques that produce light with a wavelength differing from that of the incident light by means of higher-order interaction between substances and light have attracted attention. In such wavelength conversion techniques, methods for efficiently extracting light from the interior of the material following conversion include:

(1) a method which utilizes the birefringence of a crystalline material, and accomplishes phase matching of the input and output wavelengths by propagating light at a specified angle; and
(2) a method called "quasi-phase matching" in which periodic polarization inversion regions are formed on the light propagation path, and the difference in the phases of the input and output wavelengths is eliminated in approximate terms.

Of these two methods, the latter quasi-phase matching would appear to possess numerous advantages in adaptation for practical use, e.g., the permissible width of the operating wavelength and angle of incidence is large, the phenomenon known as "walk-off" in which the input and output lights travel along different directions does not occur, and the like; accordingly, this method has been the focus of various expectations.

The formation of a polarization inversion region in a wavelength conversion element utilizing a quasi-phase matching technique can be realized (for example) by using a ferroelectric material such as lithium niobate as the substrate material, patterning an electrode in the region where it is desired to accomplish polarization inversion using a photolithographic technique, and applying a high voltage to this electrode, so that partial inversion of the crystal axes is accomplished by means of the electric field.

Besides such a method in which a polarization inversion region is formed by applying a voltage to a ferroelectric material, a wavelength conversion element in which a polarization inversion region is formed by using quartz (which is not a ferroelectric material) as the substrate, and applying stress, has been proposed in recent years (S. Kurimura, R. Batchko, J. Mansell, R. Route, M. Fejer and R. Byer: 1998 Spring Meeting of the Japan Society of Applied Physics, Proceedings 28a-SG-18).

This wavelength conversion element using quartz as the substrate material shows a light resistance that is at least 100 times greater than that of an element using a ferroelectric material as the substrate. Furthermore, the lower-limit wavelength at which the element is transparent is around 150 nm, while the same wavelength is 350 nm in the case of lithium niobate. Consequently, the following advantage is obtained: namely, light at wavelengths that conventionally could not be used, and in particular, even light at a wavelength of approximately 193 nm, which is comparable to that of an ArF excimer laser, can also be used.

Incidentally, wavelength conversion techniques are based on the mutual interaction of higher-order light and substances, and in order to obtain a high conversion efficiency, it is desirable that the energy density of the light within the wavelength conversion element be high. In cases where lithium niobate, which is a ferroelectric material, is used as the wavelength conversion material, a method that is widely practiced as a method that uses light with a high energy density is a method called the "proton exchange method" in which the refractive index is raised by replacing some of the lithium in the substrate with protons in high-temperature molten benzoic acid as shown below. This is a method in which a portion with a high refractive index is formed in the substrate by the proton exchange method, a waveguide is formed in this portion, and light is confined into this waveguide.

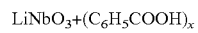

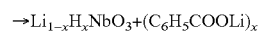

In concrete terms, after a polarization inversion region is formed by the application of an electric field, an aluminum thin film is formed on the surface of the substrate, with the region in which it is desired to form a waveguide left "as is". The formation of the aluminum thin film is accomplished by an ordinary lift-off process. After being masked with aluminum, the substrate is immersed in benzoic acid heated to a temperature of 350° C. to 400° C., and is allowed to stand for a specified time, so that the proton exchange process is promoted. Following this proton exchange, the aluminum is removed by etching. The region into which protons have been exchanged has a higher refractive index than the surrounding regions, so that an optical waveguide in which light is confined and propagated is formed. Thus, light can be confined and propagated inside a periodic polarization inversion region, so that a high conversion efficiency can be obtained.

However, in the case of a quasi-phase matching element using quartz, the following problem is encountered: namely, waveguides cannot be formed using such a proton exchange process, so that the confinement of the light is impossible; as a result, a high conversion efficiency cannot be obtained.

The present invention was devised in light of such circumstances; the object of the present invention is to provide a wavelength conversion element in which a waveguide that confines light can be formed, so that a high wavelength conversion efficiency can be obtained, even in a quasi-phase matching element using quartz.

DISCLOSURE OF THE INVENTION

The first invention that is used to achieve the object described above is a wavelength conversion element in which a plurality of polarization inversion regions are formed in a quartz crystal substrate in a periodic manner, and light that is incident from one end of the quartz crystal substrate is subjected to a wavelength conversion by being caused to pass through the plurality of polarization inversion regions, this wavelength conversion element being characterized in that a high-refractive-index region is formed so that this region passes through the plurality of polarization inversion regions in the direction of light transmission.

In this invention, since a high-refractive-index region is formed so as to pass through the plurality of polarization inversion regions in the direction of light transmission, light can be propagated through the polarization inversion regions in a state in which the light is confined into the high-refractive-index region by introducing the light into this high-refractive-index region. Accordingly, a wavelength conversion element with a high light conversion efficiency can be obtained.

The second invention that is used to achieve the object described above is the first invention, which is characterized in that the high-refractive-index region is formed by converting the area around this region into a low-refractive-index region by means of ion implantation.

By performing ion implantation so that the area surrounding the region that is desired to be converted into a high-refractive-index region is set at a low refractive index, it is possible to raise the refractive index of this portion in relative terms. A fine high-refractive-index region can be formed by combining the present invention and a photolithographic technique, and light can be propagated while being cinfined into this region.

The third invention that is used to achieve the object described above is the first invention, which is characterized in that the high-refractive-index region is formed by a ridge type waveguide.

The term "ridge type waveguide" refers to a device in which a protruding high-refractive-index part is disposed on a low-refractive-index part, and this protruding high-refractive-index part is used as an optical waveguide. In the present invention as well, light can be propagated in a state in which the light is cinfined into a protruding high-refractive-index part. Furthermore, this invention differs from the second invention in that the system can be devised so that ion implantation is not performed in the polarization inversion regions; in such a case, therefore, there is no danger that the characteristics of the polarization inversion regions will be altered.

The fourth invention that is used to achieve the object described above is the third invention, which is characterized in that the ridge type waveguide is formed by selective reactive ion etching.

The ridge type waveguide can be formed by etching the quartz crystal substrate by selective reactive ion etching. If this invention is used in combination with a lithographic process, a fine ridge type waveguide can be formed.

The fifth invention that is used to achieve the object described above is the third invention, which is characterized in that the ridge type waveguide is formed by mechanical working.

A ridge type waveguide can also be formed in the quartz crystal substrate by mechanical working such as dicing. In this invention, a ridge type waveguide can be formed by a relatively simple process.

BEST MODE FOR CARRYING OUT THE INVENTION

Figure 1:
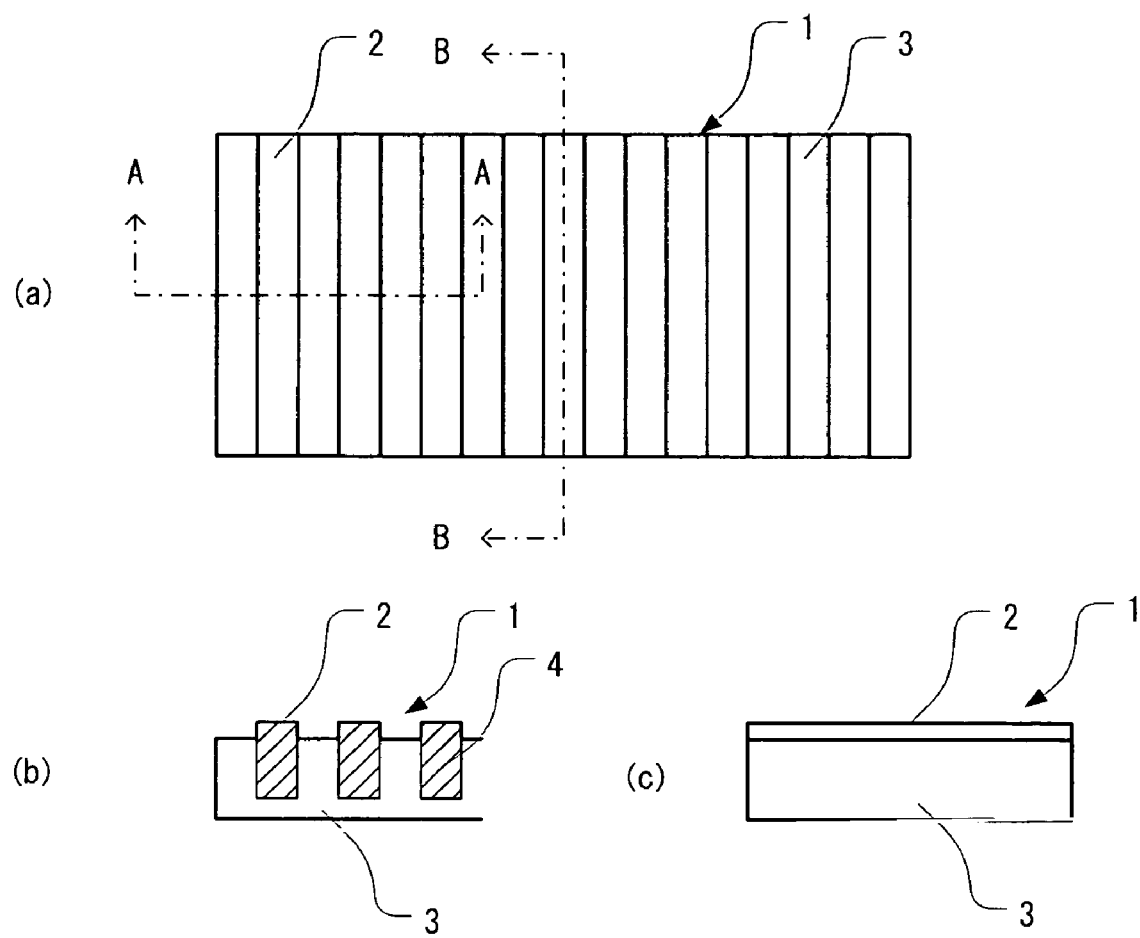
FIGS. 1(a)–1(c) are diagrams illustrating the schematic construction of a quasi-phase matching element using quartz, which is the material of a wavelength conversion element constituting a working configuration of the present invention.

A working configuration of the present invention will be described below with reference to the figures. FIG. 1 is a diagram showing the schematic construction of a quasi-phase matching element using quartz, which is the material of a wavelength conversion element constituting a working configuration of the present invention. FIG. 1(a) is a plan view, FIG. 1(b) is a sectional view along line A—A in FIG. 1(a), and FIG. 1(c) is a sectional view along line B—B in FIG. 1(a).

Protruding parts 2 are disposed in a periodic manner on one surface of a quasi-phase matching element 1. The quasi-phase matching element 1 which uses quartz is formed by a hot pressing method. Specifically, the quartz crystal substrate of this element which has periodic protruding parts 2 on one surface as shown in FIG. 1 is clamped by heater blocks from above and below; the temperature of the quartz crystal substrate is elevated, and at the point in time at which the desired temperature is reached, pressure is applied. In this case, since a stress acts only on the portions corresponding to the protruding parts 2, the crystal axis components are inverted only in these portions. These portions with inverted crystal axes grow into the interior of the crystal, and are thus propagated into the interior of the crystal, so that these portions are incorporated to a considerable extent in the direction of depth of the substrate main body part 3. The portions with inverted crystal axes (polarization inversion regions) are indicated by the symbol 4 in the diagram. Thus, a periodic twin lattice can be manufactured inside the substrate main body part 3.

Figure 2:
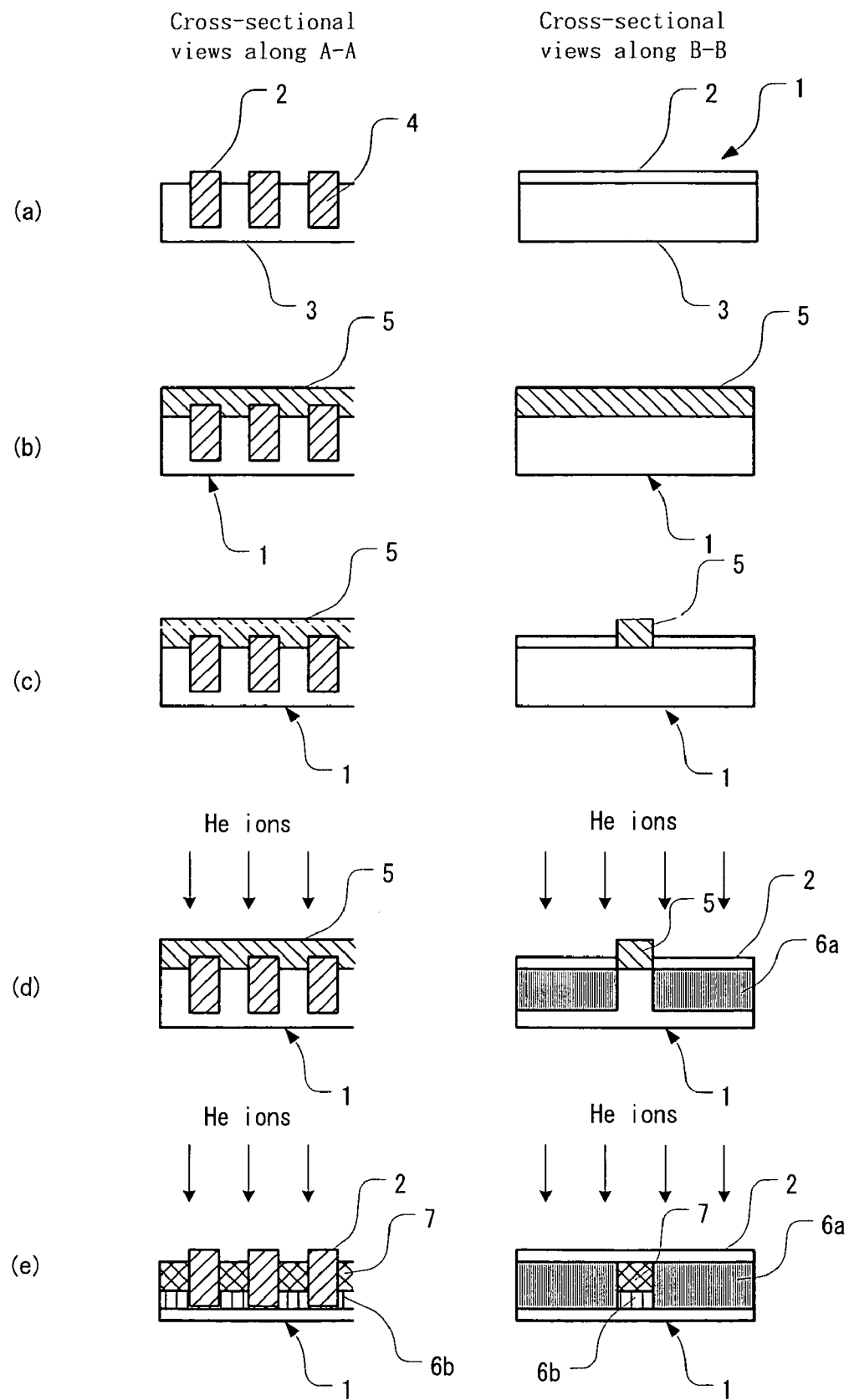
FIGS. 2(a)–2(e) a diagrams which show the process used to manufacture a wavelength conversion element constituting a working configuration of the present invention by ion implantation using the quartz quasi-phase matching element shown in FIG. 1(a) as a substrate. The drawings on the left side are sectional views along line A—A in FIG. 1(a), and the drawings on the right side are sectional views along line B—B in FIG. 1(a).

Below, the process whereby a wavelength conversion element constituting a working configuration of the present invention is manufactured by ion implantation using such a quartz quasi-phase matching element 1 as a substrate will be described with reference to FIG. 2. FIG. 2 shows sectional views along line A—A and sectional views along line B—B in FIG. 1(a). Furthermore, in the following figures, constituent elements that are the same as the constituent elements in the figures described above are labeled with the same symbols, and a description of such element may be omitted.

In FIG. 2, FIG. 2(a) is a diagram which shows the quartz quasi-phase matching element 1. A positive type resist layer 5 having a thickness sufficient to cover the protruding parts 2 is formed on the surface of this quasi-phase matching element 1 (FIG. 2(b)). Then, the resist is exposed by lithography so that the central portion in the cross-section along line B—B of the quasi-phase matching element 1 is left "as is", and the resist is developed, so that a portion in which the resist 5 remains is formed in the central part (FIG. 2(c)).

Next, using the resist 5 as a mask, He ions are implanted in the surface of the quasi-phase matching element 1. As a result, low-refractive-index regions 6a are formed in the portions where the resist 5 is absent (FIG. 2(d)).

Subsequently, the resist layer 5 is removed, and He ions with a different energy from those used in the step shown in FIG. 2(d) are implanted. Specifically, the energy of the He ions implanted in this case is increased, so that the ions do not stop in portions that are close to the surface of the substrate, but instead accumulate at a certain depth. Consequently, a low-refractive-index region 6b is newly formed in a position located at a specified depth (FIG. 2(e)).

In this state, since a low-refractive index region is not formed in the portion with a shallow depth located immediately beneath the resist 5 in FIG. 2(d), this portion forms a high-refractive-index region 7 whose refractive index is relatively higher than that of the surrounding areas. As a result, the wavelength conversion element constituting a working configuration of the present invention is completed.

In this wavelength conversion element, the high-refractive-index region 7 is formed so that this region passes through the plurality of portions with inverted crystal axes (polarization inversion regions) 4. Accordingly, if light is caused to pass through this high-refractive-index region 7, the light can be caused to pass through the portions with inverted crystal axes (polarization inversion regions) 4, and can be subjected to a wavelength conversion, in a state in which the light is confined into the high-refractive-index region 7. Consequently, a state can be produced in which the energy of the light is high inside the wavelength conversion element, so that a high wavelength conversion efficiency can be obtained.

Figure 3:
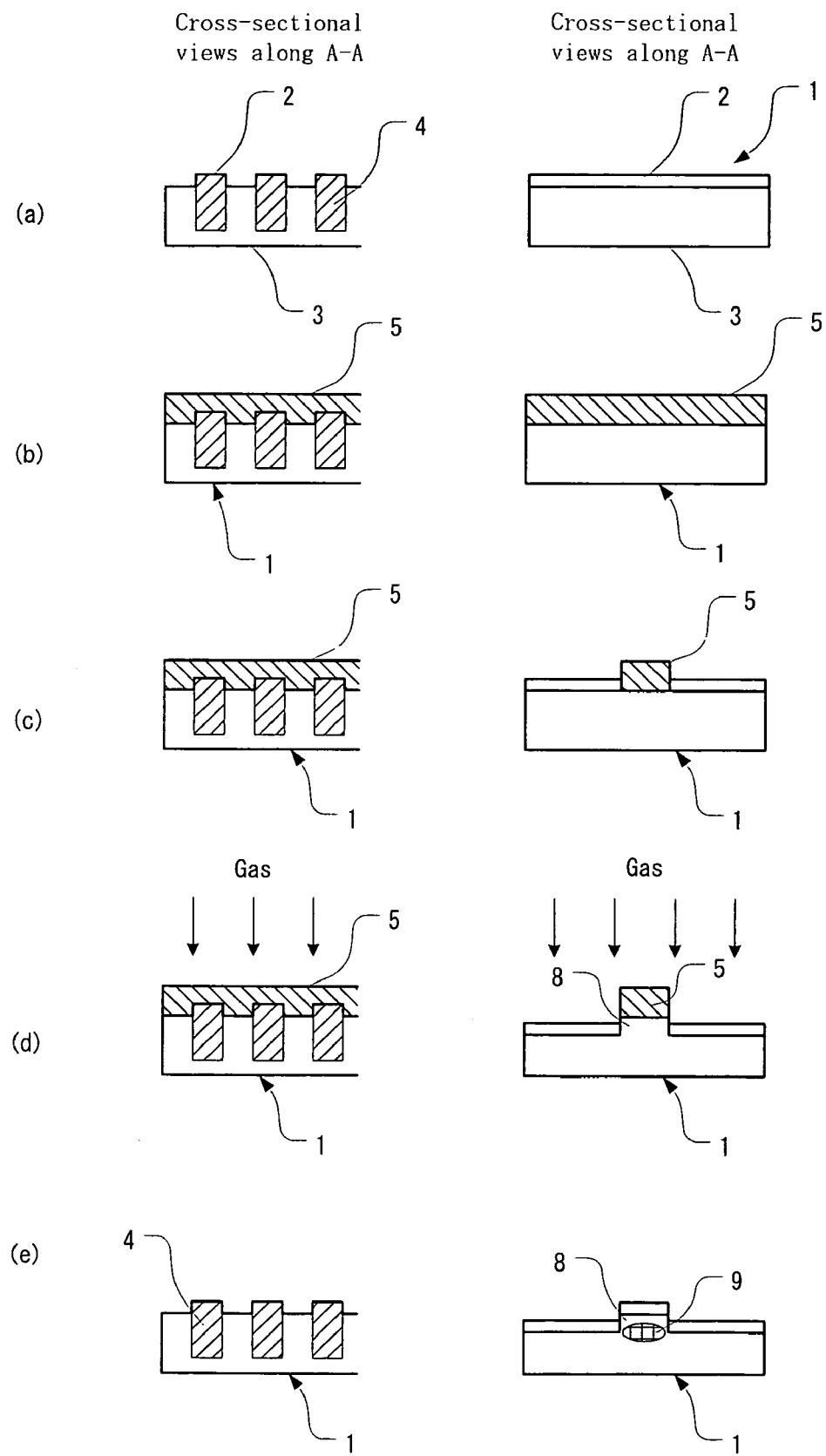
FIGS. 3(a)–3(e) are diagrams which show the process used to manufacture a wavelength conversion element constituting a working configuration of the present invention by constructing a ridge type waveguide by selective reactive ion etching in the quartz quasi-phase matching element shown in FIG. 1(a) as a substrate. The drawings on the left side are sectional views along line A—A in FIG. 1(a), and the drawings on the right side are sectional views along line B—B in FIG. 1(a).

A process used to manufacture the wavelength conversion element constituting a working configuration of the present invention by constructing a ridge type waveguide by selective reactive ion etching using the quartz quasi-phase matching element 1 shown in FIG. 1 as a substrate will be described below with reference to FIG. 3. FIG. 3 shows sectional views along line A—A and sectional views along line B—B in FIG. 1(a).

In FIG. 3, FIG. 3(a) is a diagram showing the quartz quasi-phase matching element 1. A negative type resist layer 5 with a thickness sufficient to cover the protruding parts 2 is formed on the surface of this quasi-phase matching element 1 (FIG. 3(b)). Then, the central portion of the quasi-phase matching element 1 in the sectional view along line B—B is exposed by lithography over a specified width in the left-right direction in FIG. 1, and the resist is developed, so that the resist is removed with the exposed portion left "as is" (FIG. 3(c)).

Next, using the resist as a mask, a CF4+H2 type gas is used in the surface of the quasi-phase matching element 1. As a result, when the surface of the substrate is etched, the portions covered by the resist remain so that a protruding part 8 is formed (FIG. 3(d)). Subsequently, the wavelength conversion element constituting one working configuration of the present invention is completed by removing the resist layer 5 (FIG. 3(e)).

The protruding part 8 is formed so as to pass through the plurality of portions with inverted crystal axes (polarization inversion regions) 4, and the ridge type waveguide 9 is formed in the lower part of this protruding part. Accordingly, light can be caused to pass through the portions with inverted crystal axes (polarization inversion regions) 4, and thus subjected to a wavelength conversion, in a state in which the light is confined inside the ridge type waveguide 9, by causing this light to pass through the ridge type waveguide 9. Consequently, a state can be produced in which the energy of the light is high inside the wavelength conversion element, so that a high wavelength conversion efficiency can be obtained.

Figure 4:
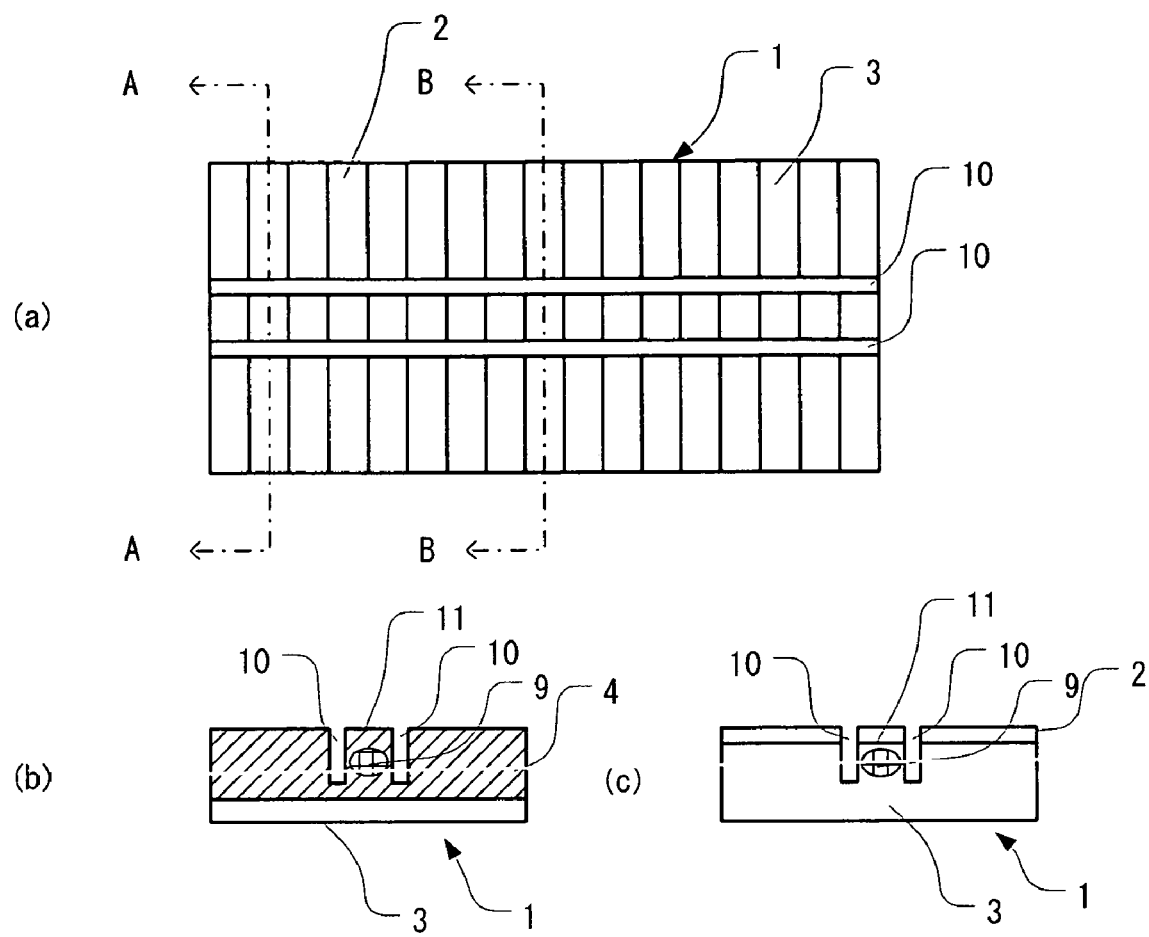
FIGS. 4(a)–4(c) are diagrams showing a wavelength conversion element constituting a working configuration of the present invention, in which a ridge type waveguide is constructed by dicing using the quartz quasi-phase matching element shown in FIG. 1(a) as a substrate.

Below, a wavelength conversion element constituting one working configuration of the present invention in which a ridge type waveguide is constructed by dicing in the quartz quasi-phase matching element 1 shown in FIG. 1 as a substrate will be described with reference to FIG. 4. In FIG. 4, FIG. 4(a) is a plan view, FIG. 4(b) is a sectional view along line A—A in FIG. 4(a), and FIG. 4(c) is a sectional view along line B—B in FIG. 4(a).

The wavelength conversion element shown in FIG. 4 is formed by forming grooves by means of dicing in the quartz quasi-phase matching element 1 shown in FIG. 1. Specifically, two grooves 10 are diced in parallel along the light passage direction. Consequently, as is shown in FIGS. 4(b) and 4(c), a protruding part 11 which is positioned between the two grooves 10 is formed on the upper surface in the figures, and a ridge type waveguide 9 is formed inside this protruding part. Accordingly, light can be caused to pass through the portions with inverted crystal axes (polarization inversion regions) 4, and thus subjected to a wavelength conversion, in a state in which the light is confined inside the ridge type waveguide 9, by causing the light to pass through this ridge type waveguide 9. Consequently, a state can be produced in which the intensity of the light is high inside the wavelength conversion element, so that a high wavelength conversion efficiency can be obtained.

In this method, since the formation of the ridge type waveguide 9 is accomplished by mechanical working, the process is simple; furthermore, since there is no use of ion implantation, etc., this method is characterized by the fact that there is no alteration of the properties of the portions with inverted crystal axes (polarization inversion regions) 4.

Furthermore, in FIGS. 3 and 4, the low-refractive-index substance that is used to form the ridge type waveguide 9 is air; however, it would also be possible, for example, to cover the upper surface of the waveguide conversion element shown in FIGS. 3 and 4 with a substance that has a lower refractive index than quartz.

The invention claimed is:

1. A wavelength conversion element in which a plurality of polarization inversion regions are formed in a quartz crystal substrate in a periodic manner, and light that is incident from one end of the quartz crystal substrate is subjected to a wavelength conversion by being caused to pass through the plurality of polarization inversion regions, this wavelength conversion element being characterized in that a high-refractive-index region is formed so that this region passes through the plurality of polarization inversion regions in the direction of light transmission, and wherein the high-refractive-index region is formed by converting the area around this region into a low-refractive-index region by means of ion implantation.

* * * * *